US007353453B1

(12) United States Patent
Simmons

(10) Patent No.: US 7,353,453 B1
(45) Date of Patent: Apr. 1, 2008

(54) METHOD AND SYSTEM FOR CATEGORIZING DATA OBJECTS WITH DESIGNATION TOOLS

(75) Inventor: Alex J. Simmons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 10/186,820

(22) Filed: Jun. 28, 2002

(51) Int. Cl.
*G06F 17/00* (2006.01)
(52) U.S. Cl. .................. 715/541; 345/179; 345/173
(58) Field of Classification Search ................ 715/541, 715/530, 531, 512
See application file for complete search history.

(56) References Cited

U.S. PATENT DOCUMENTS

| | | | | |
|---|---|---|---|---|
| 5,517,578 | A | * | 5/1996 | Altman et al. .............. 382/181 |
| 5,561,446 | A | * | 10/1996 | Montlick ..................... 345/173 |
| 5,809,498 | A | * | 9/1998 | Lopresti et al. ................ 707/6 |
| 5,838,819 | A | * | 11/1998 | Ruedisueli et al. ......... 382/187 |
| 5,970,455 | A | * | 10/1999 | Wilcox et al. .............. 704/270 |
| 6,035,324 | A | * | 3/2000 | Chang et al. ............... 709/203 |
| 6,279,014 | B1 | * | 8/2001 | Schilit et al. ............... 715/512 |
| 6,355,889 | B1 | * | 3/2002 | Butcher et al. .......... 178/18.03 |
| 6,487,569 | B1 | * | 11/2002 | Lui et al. ..................... 715/530 |
| 6,529,215 | B2 | * | 3/2003 | Golovchinsky et al. ..... 715/764 |
| 6,565,611 | B1 | * | 5/2003 | Wilcox et al. .............. 715/541 |
| 6,681,045 | B1 | * | 1/2004 | Lapstun et al. ............. 382/187 |
| 6,859,909 | B1 | * | 2/2005 | Lerner et al. ............... 715/512 |
| 7,091,959 | B1 | * | 8/2006 | Clary ......................... 345/173 |
| 7,259,753 | B2 | * | 8/2007 | Keely et al. ................ 345/179 |

OTHER PUBLICATIONS

Wilcox et al., "Dynomite: A Dynamically Organized Ink and Audio Notebook", Computer-Human Interaction, Mar. 27, 1997, pp. 186-193.*

(Continued)

*Primary Examiner*—William Bashore
*Assistant Examiner*—Amelia Rutledge
(74) *Attorney, Agent, or Firm*—Merchant & Gould

(57) ABSTRACT

A system and method for categorizing data objects with designation tools. A designation tool is provided for categorizing data in an electronic document. A user may select a designation tool corresponding to a data category with which to categorize data to be inputted into an electronic document. The data category is displayed in association with the data entered with the designation tool. The designation tool may also be used to categorize existing data content in an electronic document. Data that is selected with a designation tool is categorized into the data category associated with that designation tool.

21 Claims, 13 Drawing Sheets

OTHER PUBLICATIONS

Wacom Intuos TM User's Manual for Windows, May 22, 2000, copyright Wacom Company, Ltd., p. 1-165.*

U.S. Official Action dated Jul. 13, 2005 in U.S. Appl. No. 10/186,812.

U.S. Office Action Summary dated Jul. 27, 2005, U.S. Appl. No. 10/186,847, filed Jun. 28, 2002, entitled "Method and System for Editing Electronic Ink," Inventor: Alex J. Simmons.

U.S. Office Action Summary dated Sep. 20, 2005, U.S. Appl. No. 10/186,865, filed Jun. 28, 2002, entitled "System and Method for Automatically Recognizing Electronic Handwriting In An Electronic Document and Converting To Text," Inventor: Alex J. Simmons; Kurt DelBene.

U.S. Office Action Summary dated Jan. 27, 2006, U.S. Appl. No. 10/186,847, filed Jun. 28, 2002, entitled "Method and System for Editing Electronic Ink," Inventor: Alex J. Simmons.

U.S. Office Action Summary dated Aug. 22, 2007, U.S. Appl. No. 10/186,874, filed Jun. 28, 2002, entitled "Method and System for Selecting Objects on a Display Device," Inventors: Alex J. Simmons and Mark Yalovsky.

* cited by examiner

884

882

883

| Shape | Label/Tooltip |
|---|---|
| (A) | None |
| ☑ | Blue Checkbox — 883(a) |
| ⭐ | Blue 5-point Star |
| ❗ | Blue Exclamation |
| ➤ | Blue Arrow — 883(b) |
| ☑ | Yellow Checkbox |
| ⭐ | Yellow 5-point Star — 883(c) |
| ❗ | Yellow Exclamation |
| ➤ | Yellow Arrow |
| ☑ | Green Checkbox |
| ⭐ | Green 5-point Star — 883(g) |
| ❗ | Green Exclamation |
| ➤ | Green Arrow — 883(h) |

883(d), 883(e), 883(f), 883(i), 883(j), 883(k), 883(l)

METHOD AND SYSTEM FOR CATEGORIZING DATA OBJECTS WITH DESIGNATION TOOLS

RELATED APPLICATIONS

This patent application is related to the following co-pending non-provisional patent applications: U.S. patent application Ser. No. 09/852,799 filed on May 11, 2001, entitled "Serial Storage of Ink and Its Properties" and U.S. patent application Ser. No. 09/430,150 filed on Oct. 29, 1999, entitled "Universal File Format for Digital Rich Ink Data." Both related applications are assigned to the Microsoft Corporation.

This patent application is also related to the following non-provisional patent applications: U.S. patent application Ser. No. 10/186,388, entitled "Writing Guide for a Free-Form Document Editor"; U.S. patent application Ser. No. 10/186,847, entitled "Method and System for Editing Electronic Ink"; U.S. patent application Ser. No. 10/186,874, entitled "Method and System for Selecting Objects on a Display Device"; U.S. patent application Ser. No. 10/186,812, entitled "Resolving Document Object Collisions"; U.S. patent application Ser. No. 10/186,837, entitled "Space Management for Electronic Documents"; U.S. patent application Ser. No. 10/186,865, entitled "System and Method for Automatically Recognizing Electronic Handwriting in an Electronic Document and Converting to Text"; U.S. patent application Ser. No. 10/186,463, entitled "Method and System for Displaying and Linking Ink Objects with Recognized Text and Objects". These applications and the application herein are all being filed on the same date, Jun. 28, 2002, and are assigned to the Microsoft Corporation. The subject matter of each of these applications is hereby fully incorporated by reference.

FIELD OF THE INVENTION

The present invention relates to categorizing data objects within electronic documents and more specifically relates to designating into data categories data content inputted via user handwriting with electronic ink into an electronic document through use of a designation tool associated with a data category.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional pen and paper method is also flexible in that a writer can generally write in any format anywhere on the page. One of the limitations, however, with handwriting on paper is that handwritten-content is not easily manipulated organized, or transferred without requiring a user to re-write the content. In other words, organizing handwritten information based on the specific content of the information typically requires rewriting the information on a new sheet of paper.

With this limitation in mind, some pen and paper hand writers label the content of handwritten information on paper. One method for labeling (or categorizing) handwritten information is to use different color inks when making handwritten notations. When doing so, these writers sometimes designate different colored inks to correspond to different informational categories depending on the content of the handwritten information. For example, during a meeting a note-taker may script "to do" information in red, "summary" information in green, and "important topics" in yellow. Alternatively, paper note-takers may script all information in the same color ink then post-designate the information by underlining or highlighting specific information with the ink color corresponding to the appropriate category for that information content.

Several limitations, however, are associated with designating the data content of handwritten script into information categories on traditional paper. As one example, the writer must carry with him or her a number of colored pens equal to the number of information categories that the writer intends to designate information into. Additionally, the writer must either remember which ink color corresponds to which data content category or write a legend onto paper and keep it in close association with the handwritten information so that the legend may be referred to at a later time.

Further, if after scripting the information in an ink color corresponding to the content category of the scripted information, the writer wishes to re-designate the information into a different category, the writer must re-write the information in the different ink color corresponding to the newly chosen data category. Yet another drawback of designating handwritten content using the traditional pen and paper method is evidenced in instances wherein a writer chooses to organize handwritten information by like information content categories. In this instance, the writer must also re-write the information as organized by content category.

With the widespread use of personal computers, many note-takers have chosen exchange the traditional pen and paper note-taking for typing to textual information using word processing software running on a personal computer. Unlike handwriting information with a traditional pen and paper, the advantage of such electronic methods of recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional pen and paper. Furthermore, traditional pen and paper provide the user with considerable flexibility for editing a document, recording notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, and capitalize on the advantages associated with traditional pen and paper writing, there have been various attempts to create an electronic tablet that can record handwriting. Such electronic tablets typically comprise a screen and a handheld device that is similar to a pen (sometimes called a "stylus"). A user can write with the handheld device on the screen of the electronic tablet in a similar manner to traditional pen and paper. The electronic tablet can "read" the strokes of the user's handwriting with the handheld device and recreate the handwriting in electronic form on the screen with "electronic ink." This electronic tablet approach can be employed in a variety of ways including, on a personal computer and on a handheld computing device.

Recently, other computer systems have been developed that provide for more sophisticated creation and manipulation of electronic ink. For example, the Microsoft READER application permits one to add electronic ink to a document. The system stores the ink and provides it to a user when requested. Other applications (for example, drawing applications associated with the Palm and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper.

In spite of the advances in electronic tablets and electronic ink, there are still several limitations with the performance of such electronic handwriting devices. One of those limitations is the inability of an electronic tablet system to allow a user to change pens so that a as to designate data content written with a given pen into a data category associated with that pen.

Further, traditional electronic tablet and ink systems do not provide users with an ability to designate existing handwritten information into data content categories for easy recognition.

In view of the foregoing, there is a need for a system and method for designating into various data categories information handwritten by a user with electronic ink. There is also a need for a system and method to render categorized handwritten data recognizable by the user. Further, there is a need for a system and method that is operative to enable a user to render categorized data as "task completed" or "content recognized" upon completion or recognition of the categorized data by the user.

SUMMARY OF THE INVENTION

The present invention provides a system and method for designating handwritten electronic data contents into data content categories. One embodiment of the present invention allows a user to handwrite information in electronic ink on an electronic tablet associated with a personal computer or personal hand held computing device. In one embodiment, the user may handwrite information with electronic ink using different designation tools, wherein each designation tool corresponds to a specific data category. The data categories associated with the designation tools of the present invention may be labeled in any manner so long as they are useful to a user in organizing or prioritizing data content. Examples of data categories that may be associated with designation tools of the present invention and may be useful to a user in note-taking include, without limitation, "action item," "priority item," "note summaries," "personal to-dos," "personal reminders," "important information," "hot issues," and "key takeaways."

The designation tools of the present invention allow electronic ink users to pre-designate into data categories the content of information to be written with electronic ink. Upon determining the desired data category for the information, the user selects the designation tool associated with that data category. Such a selection may be made from a split button drop down menu that reveals the available designation tools and associated data categories. When a user writes with a designation tool associated with a specific data category, the information written by the user is rendered identifiable as associated with that specific data category. In one embodiment, a data category is identifiable by a data object note tag that is associated with categorized information written with a designation tool. The data object note tag may further be associated with a completion/recognition checkbox. In one embodiment, the completion/recognition checkbox is engageable by a user so as to reflect "task complete" or "content recognized" status. The data object note tag may bear the label associated with the data category or otherwise render identifiable the associated data category. The data object note tag may be located at the front of the information node.

In another embodiment, the designation tools are operative to post-designated into data categories existing data content. In this embodiment, a user of electronic ink may select a designation tool to categorize information previously written on an electronic tablet. One example of post-designating written data content is to highlight the written data content with a designation tool associated with the desired data category. In this embodiment, the designation tool may take the form of a highlighter. Further, in this embodiment, similar to the pre-designating embodiment described above, the categorized information may be associated with a data object note tag and completion/recognition checkbox corresponding to a specific data category.

Yet another embodiment of the present invention allows a user of electronic ink to re-categorize information displayed on a display screen. In this embodiment, previously categorized information may be re-categorized as desired by the user. Additionally, information written with electronic ink may be categorized into more than one data category. In this embodiment, the information may be associated with more than one object note tag and completion/recognition checkbox.

In yet another embodiment of the present invention, a designation tool may be operable to auto-convert information from handwritten to text format. In this embodiment, a user may select a designation tool associated with the auto-conversion feature. Data content handwritten with and auto-conversion designation tool is auto converted from handwritten script to text. The auto-conversion from script to text can occur at predetermined points in the writing, i.e., at the end of a logical line, paragraph or page.

The designation tools of the presentation may be fully customizable by the user. For example, the data categories associated with the designation tools may be identifiable to a user by ink color, ink width, or highlighting. Additionally, the object note tags associated with the designation tools may reflect the associated data category in any manner, so long as the category associated with data content is apparent to the user.

The various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Figure 1:
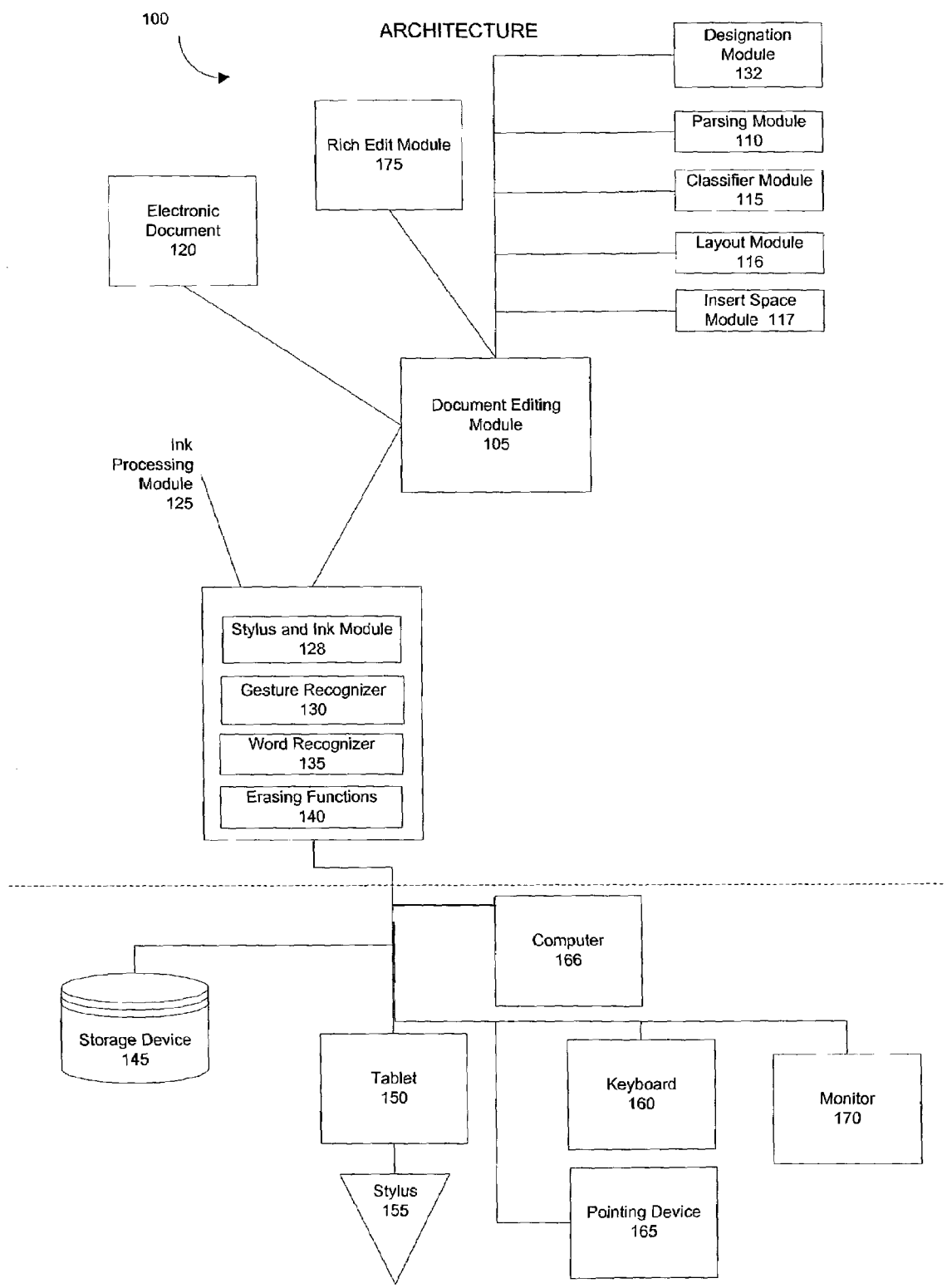
FIG. 1 is a block diagram illustrating an exemplary operating environment for implementation of various embodiments of the present invention.

Turning now to the drawings, wherein like numerals represent like elements throughout all drawings, FIG. 1 is an exemplary architecture 100 illustrative of an operating environment for writing, editing and categorizing information written with electronic ink in accordance with an embodiment of the present invention. FIG. 1 shows typical hardware and software components used in operating the invention from a functional perspective. Conventional input devices are represented by the keyboard 160 and the pointing device (mouse) 165. A user can enter commands and information into the computer 166 using the input devices. Other input devices (not shown) may include a microphone, joystick, game pad, satellite dish, and scanner. A conventional output device, such as monitor 170, is used to display information from the computer 166. Other output devices (not shown) can include a printer or speaker. Other hardware components shown in FIG. 1 include an electronic tablet 150 and an accompanying stylus 155. The tablet 150 and stylus 155 are used to input handwriting strokes which are converted to collections of data that can be represented as electronic ink. The electronic ink may be incorporated into an electronic document 120 and may be displayed on either the electronic tablet 150, the monitor 170, or both. Although the electronic tablet 150 and the monitor 170 are illustrated as being distinct, in the preferred embodiment they are either coupled or form a single component. The joint tablet/monitor component has the ability to display information and receive input from the stylus 155. Also shown among the hardware components is a conventional electronic storage device 145.

In the representative architecture 100 all of the hardware components are coupled to an ink processing software module 125. It should be understood by those skilled in the art that FIG. 1 is merely representative. The ink processing module 125 is operable for receiving data from the electronic tablet 150 and/or the stylus 155 and rendering that data as electronic ink. In the preferred embodiment, the ink processing module 125 is a collection of software modules that perform different tasks for rendering handwriting strokes as electronic ink. For example, the stylus and ink module 128 can receive data describing the positions and angles of the stylus for a series of handwriting strokes. The stylus and ink module 128 can interpret the data for rendering electronic ink. Other software modules, such as a gesture recognizer 130 and word recognizer 135 can be designed to identify certain handwriting strokes and assign them a particular significance. For example, certain gestures such as a cross-out may be recognized and associated with other editing processes. The ink processing module 125 can also include an erasing functions module 140 for removing electronic ink that has been previously rendered.

Although ink processing modules are known in the art and necessary for an electronic tablet to function, what is needed is a document editing module, such as the one shown in FIG. 1, that enhances the performance of an electronic tablet. Specifically, document editing module 105 facilitates the manipulation of electronic ink so that a user can create and manipulate an electronic document 120 with greater ease and sophistication. The document editing module 105 may comprise a collection of software modules for controlling and manipulating electronic ink rendered on the monitor 170. For example, a parsing module 110 can be used to identify handwriting strokes that are selected by the user for editing. Selected strokes may be highlighted or shaded to assist the user in identifying which strokes are to be edited. A classifier module 115 can identify certain handwriting strokes as being part of a word or drawing. Software modules such as the layout module 116 and the insert space module 117 can be designed to control how electronic ink is rendered and moved. Additionally, the document editing module 105 can include a designation module 132 operative to categorize written information into various data categories as further described herein. The editing modules shown in FIG. 1 are representative and those skilled in the art should understand that other modules may also be part of or coupled to the document editing module 105. For example, the document editing module may also work with a rich edit module 175 that provides added functionality.

Figure 2:
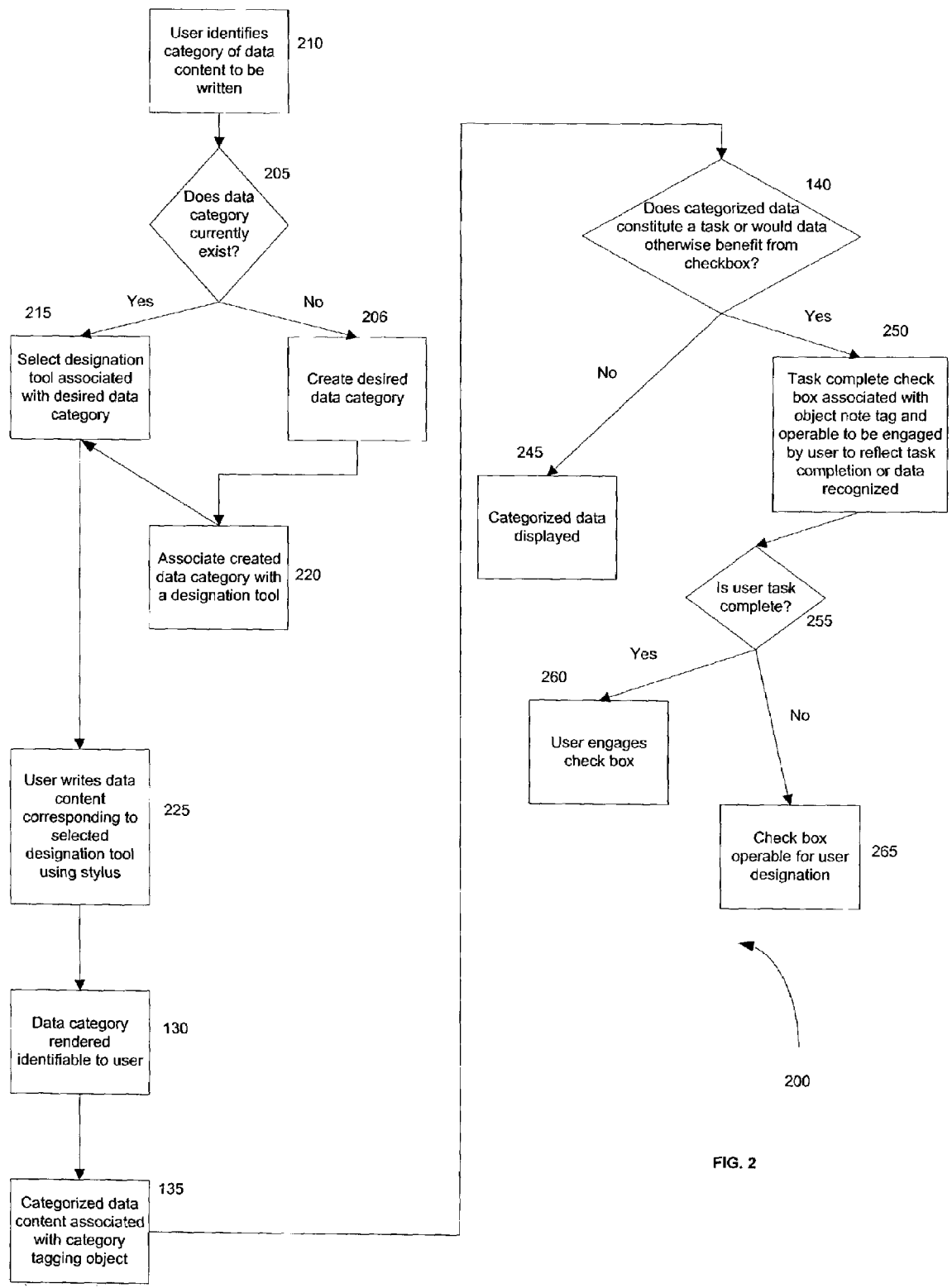
FIG. 2 is a logical flowchart illustrating steps of categorizing information in accordance with an exemplary embodiment of the invention.

FIG. 2 is a logical flow chart illustrating the steps involved in performing one embodiment of a method 200 for categorizing data content written with electronic ink by a user. Beginning with step 210, a user first identifies a data content category appropriate to correspond to the content of the data to be written in electronic ink by a user. If this data category does not currently exist as a part of the designation module (step 205), the user may create the desired data category in Step 206. (See also FIG. 3.) If the user is creating a new data category, the user associates the created data category with a corresponding designation tool in step 220. Once the data category identified by the user is created, or if the category currently exists, a user next selects in step 215 a designation tool corresponding to the chosen data category. (See also FIG. 4.) After selecting the designation tool, the user writes the data content that corresponds to the category associated with the selected designation tool in step 225. In a preferred embodiment, a user may write this information in electronic ink with a stylus on an electronic tablet. Those of ordinary skill in the art will further appreciate that the handwriting may be on the screen of a handheld personal digital assistant, a cellular telephone, or other personal computing device.

In writing the data content, a user's handwriting appears in a form of electronic ink on the screen. At a logical point in the writing, the data content becomes identifiable by the data category associated with the selected designation tool. Examples of logical points in the writing for data to be rendered identifiable as categorized include, without limitation, the beginning or end of a line, heading, paragraph or page. Further examples of logical points to render data identifiable as categorized include when a user engages a different designation tool or disengages an engaged designation tool.

The data category is rendered identifiable to the user in step 230. The data category may be rendered identifiable to the user by any number of means, so long as the user recognizes the data category associated with the written data content. One means of rendering the data category identifiable is by associating the data content with a data object note tag in step 235. If the data content constitutes a user task (step 240) or otherwise would benefit from an engageable check box, the data object note tag may be associated with a completion/recognition checkbox in step 250. The completion/recognition checkbox (step 255) is engageable so that upon completion of a task or user recognition of information content, a user may engage the completion checkbox to reflect that the task has been completed or data recognition has occurred in step 260. The completion/recognition checkbox remains engageable for designation until engaged by the user in Step 265. In one embodiment, an engaged checkbox houses a ✓ or X. A user may find the checkbox helpful when creating "to-do" list, for example.

The physical features of designation tools are fully configurable by the user in both content and display. For example, a designation tool may be associated with any data category so long as the data category is useful to the user in organizing and prioritizing data content. Examples of data categories include, without limitation, "action items," "priority items," "note summaries," "personal to-dos," "personal reminder," "important information," "hot issues," and "key takeaways." In one embodiment, a user may choose to associate a data object note tag with a data designation tool. In this instance, data object note tag may display the data category label in close proximity with the categorized data content. This allows the user to readily recognize the data category associated with certain written data content. Alternatively, the user may choose to reflect the data category associated with the selected designation tool in some other manner specific to the user, so long as the user recognizes the data category associated with the appropriate written data content. As stated above, the data object note tag may also comprise a completion/recognition check box. In one embodiment, the check box is associated in close proximity to written data content and is engageable by the user upon completion of a written task or recognition of written information.

Figure 3:
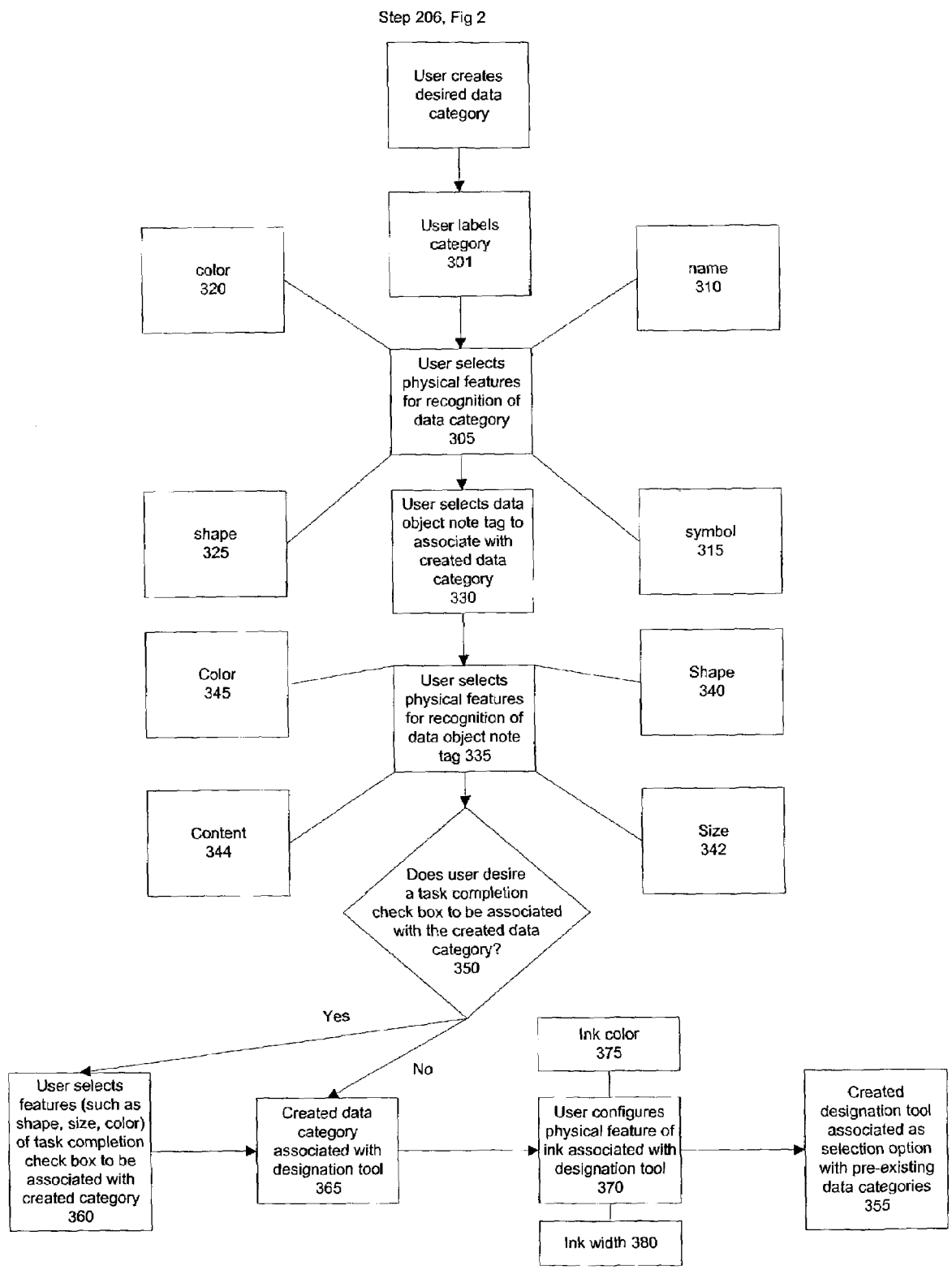
FIG. 3 a logical flowchart illustrating steps of creating a designation tool corresponding to a data category in accordance with an exemplary embodiment of the invention.

FIG. 3 is a logical flow chart illustrating the steps 300 associated with one embodiment of the present invention wherein the data category to be associated with written content does not currently exist as part of the designation module and therefore needs to be created by the user. Following from FIG. 2, step 210 wherein the user creates the desired data category, with which to associate data content to be written in electronic ink, in FIG. 3, step 301 the user labels the newly created category. The user may label the category with any word, shape, color or symbol, so long as the user understands which data category the label is associated with. The user may configure all physical features associated with the recognition of the created data category in step 305. Examples of physical features of the data category label which may be configurable by the user include name, symbol, color, and shape as represented in blocks 310, 315, 320 and 325, respectively. After configuring the physical features of the data category display label, the user may configure a data object note tag to associate with the created data category in step 330. The user may fully configure the physical features of the data object note tag in step 335, so long as the user recognizes which data category is associated with a given data object note tag. Examples of physical features which may be configurable by the user include shape, size, content, and color of the object tag as illustrated in 340, 342, 344 and 345, respectively. If the user chooses to associate a checkbox with the data object note tag in step 350, the checkbox is also fully configurable by the user in step 360. For example, the user may choose the shape, size, and/or color of the checkbox. The user may also configure the physical features of the checkbox as engaged or disengaged. Once the data category has been created, the created data category is associated with a designation tool in step 365. The user may also configure the physical features of the electronic ink that is associated with a given designation tool in step 370. Examples of configurable features of designation tool's ink include ink color 375 and width 380. The designation tool is then associated as an additional selection option with preexisting data categories in step 355.

Figure 4:
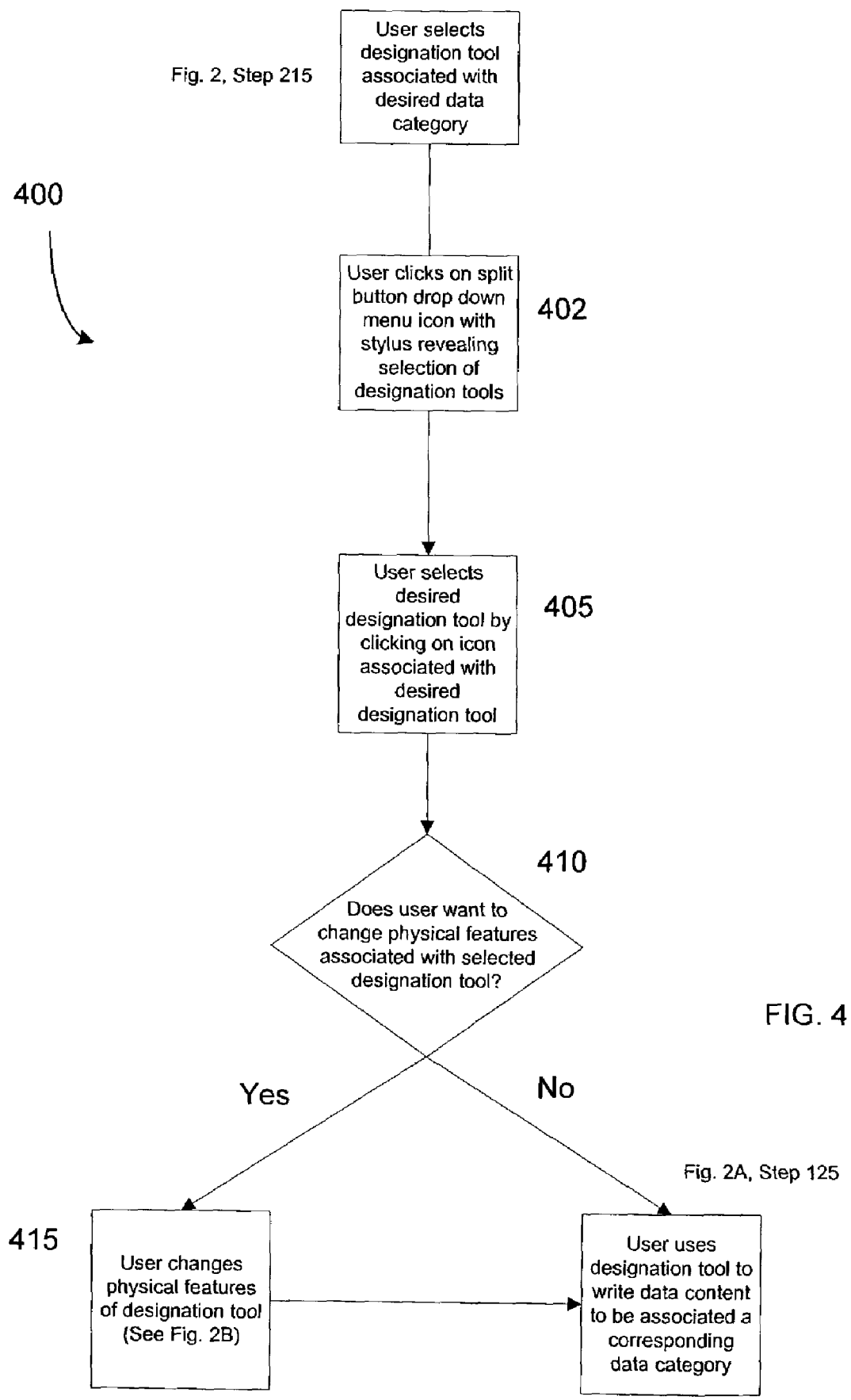
FIG. 4 is a logical flowchart illustrating steps of selecting a designation tool with which to categorize information in accordance with an exemplary embodiment of the invention.

FIG. 4 is a logical flow chart 400 illustrative of an exemplary embodiment of the present invention wherein the user selects a designation tool with which to categorize data content to be written by a user in electronic ink. Following from FIG. 2, step 215, in selecting a designation tool with which to write data to be associated with a corresponding data category, the user in step 402 may use a stylus to click on a split button drop down menu icon on a tool bar thereby revealing a selection of designation tools, each designation tool associated with a different data category with which to designate data content to be written by the user. After revealing the options of designation tools, the user in step 405 may use the stylus to select the desired designation tool by clicking on an icon associated with the desired designation tool. The user may also have the option at this point, as reflected in step 410, to configure the physical features associated with the selected designation tool. Should the user elect to reconfigure the physical features of a given designation tool, the user may follow the steps set forth in FIG. 3 as reflected in step 415. Once the user has selected the appropriate designation tool and is satisfied with the physical features associated with the data category label and associated data object note tag, the user may then write the data content to be associated with the selected data category with the designation tool as reflected in FIG. 2, step 225.

Figure 5A:
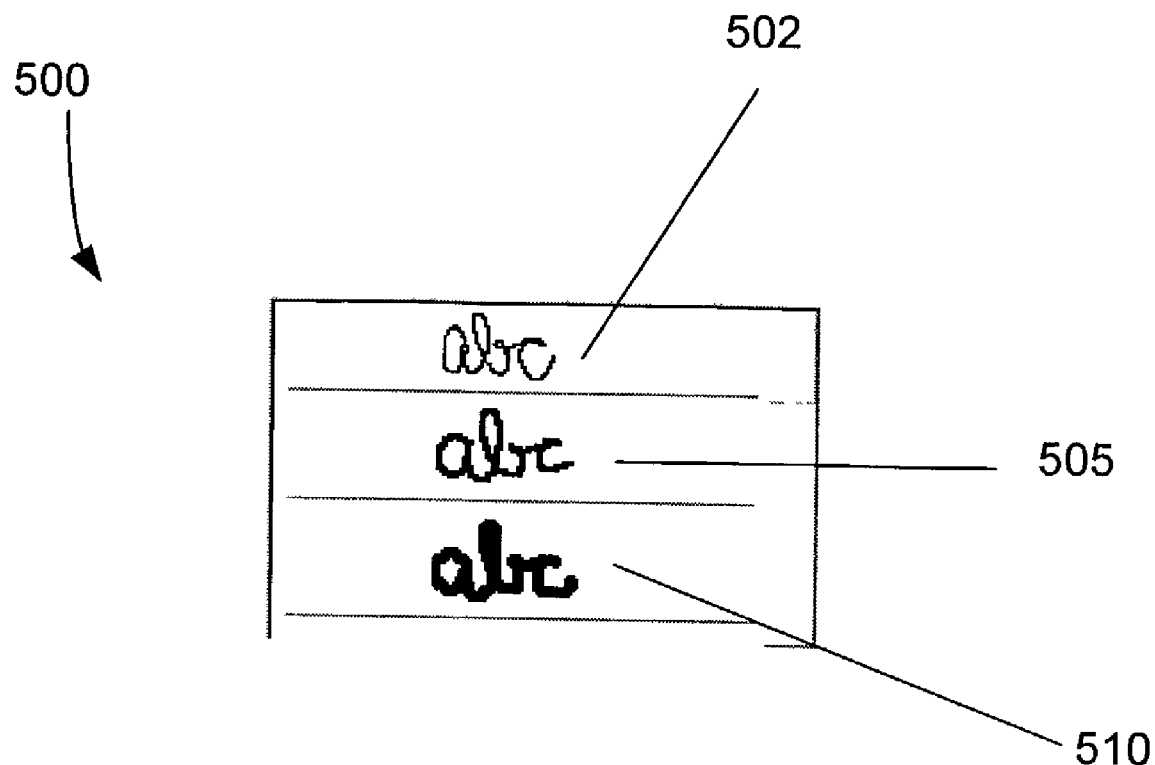
FIG. 5A is a representative display illustrating the configurability of electronic ink of an exemplary embodiment of the present invention.
Figure 5B:
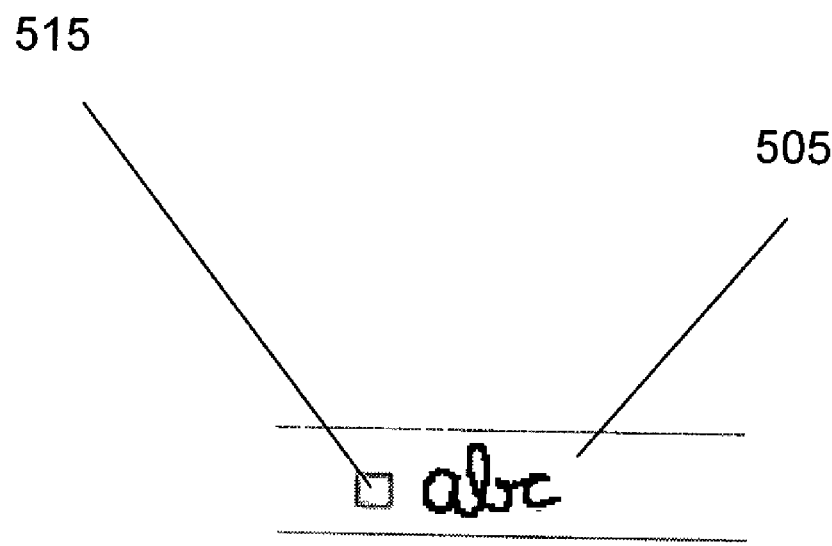
FIG. 5B is a representative display illustrating the configurability of electronic ink of an exemplary embodiment of the present invention.

FIG. 5A represents exemplary embodiments 500 of the configurability of the differing electronic ink thicknesses that may be associated with the designation tools of the present invention. As shown in FIG. 5A the ink associated with specific categorizing tools may be of thin width 502, medium width 505, or thick width 510. Ink width may be used to render identifiable to a user a data category associated with the written data content. One of ordinary skill in art world would appreciate that the ink width associated with the various designation tools may vary in width so long as the script remains readable by the user. FIG. 5B represents an exemplary embodiment of the present invention wherein the ink width associated with a designation tool is that of medium width 505. Further, the medium width ink script displayed in FIG. 5B is associated with a checkbox 515.

Figure 6A:
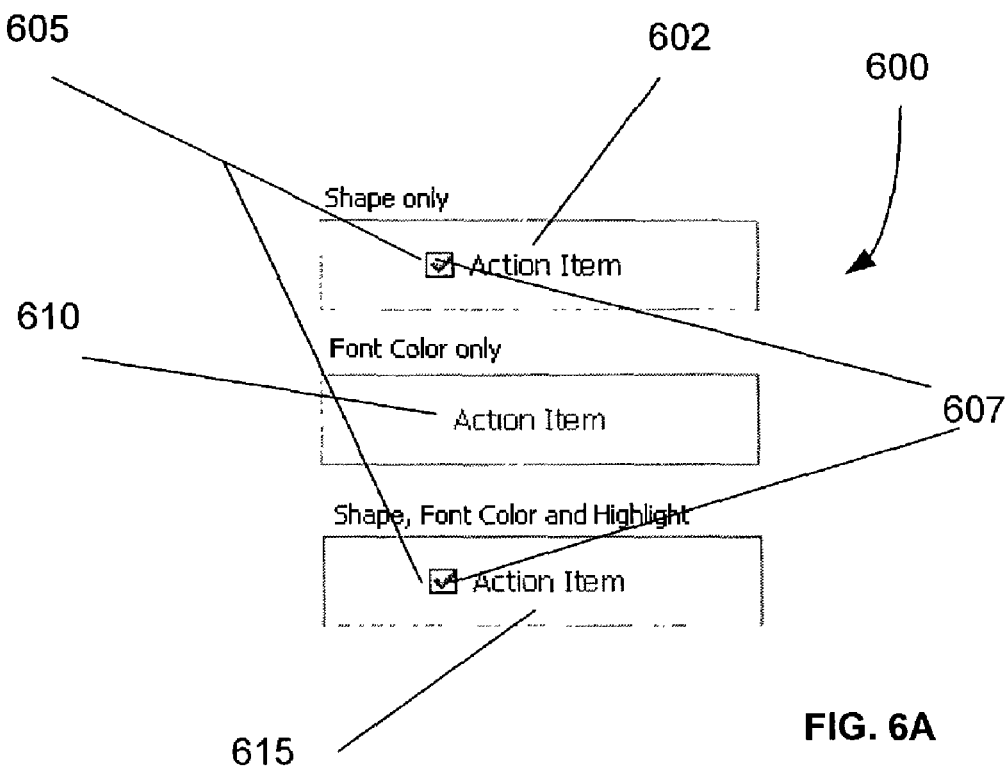
FIG. 6A is a representative display illustrating the configurability of data object note tags of an exemplary embodiment of the present invention.

As stated above, a designation tool of the present invention may be associated with a data object note tag that bears the label of the data category associated with the designation tool used. Exemplary embodiments of a data object note tag is reflected in FIG. 6A. The data object note tag 600 may include a category label 602 of the data category associated with a designation tool. In the embodiment shown, the data category is labeled "Action Item" 602. The data object note tag may also comprise a checkbox 605 that may be engaged 607 by a user to reflect when a task has been completed or data content has been recognized. Alternatively, the data object note tag associated with the categorizing tool may be written in a variety of colors 610 so that the user may readily recognize the data category associated with the written data content. In yet another embodiment, the data object note tag may be labeled with highlighting 615 so that a user may readily recognize the data category associated with the data object note tag.

Figure 6B:
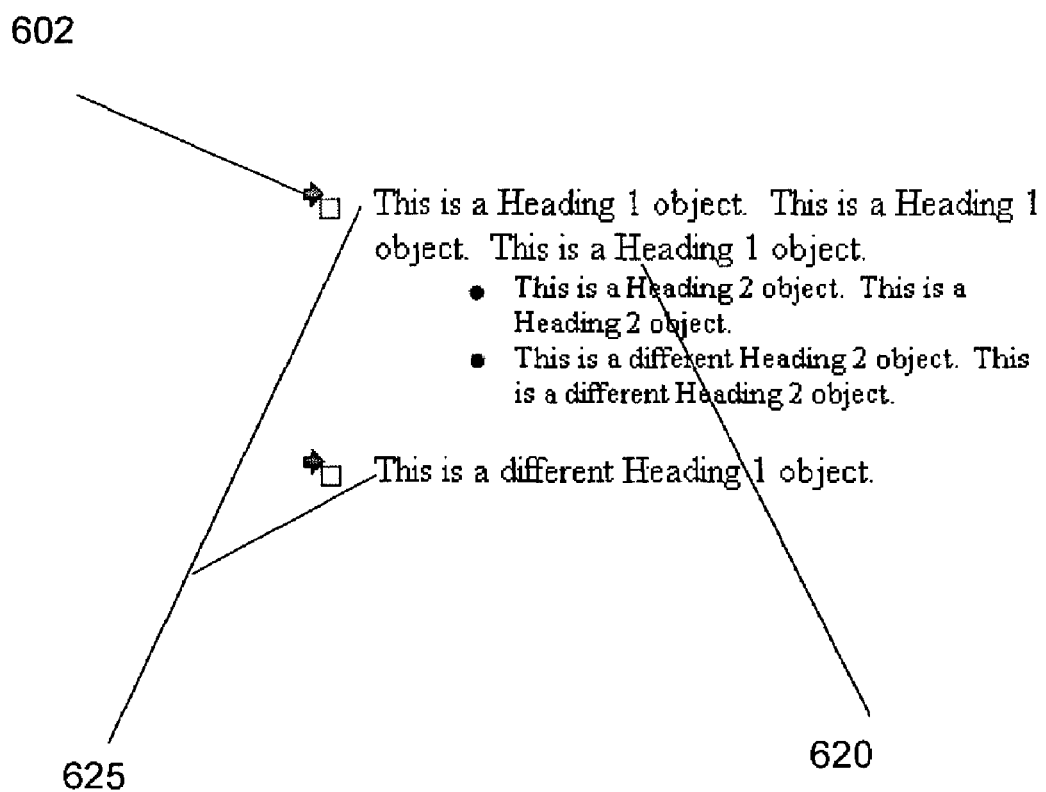
FIG. 6B is a representative display illustrating the configurability of the location of data object note tags in relation to categorized information of an exemplary embodiment of the present invention.

FIG. 6B represents an exemplary embodiment of the location of data object note tag 602 associated with data content 620 (in this instance, represented in text format, not handwritten script format). A new data object note tag may appear at logical breaks in the text such as the beginning of new headings 625. Additionally, new data object note tags may appear when a different designation tool is selected and used by a user. Data object note tags may also appear at the beginning on lines, paragraphs or pages.

Figure 7:
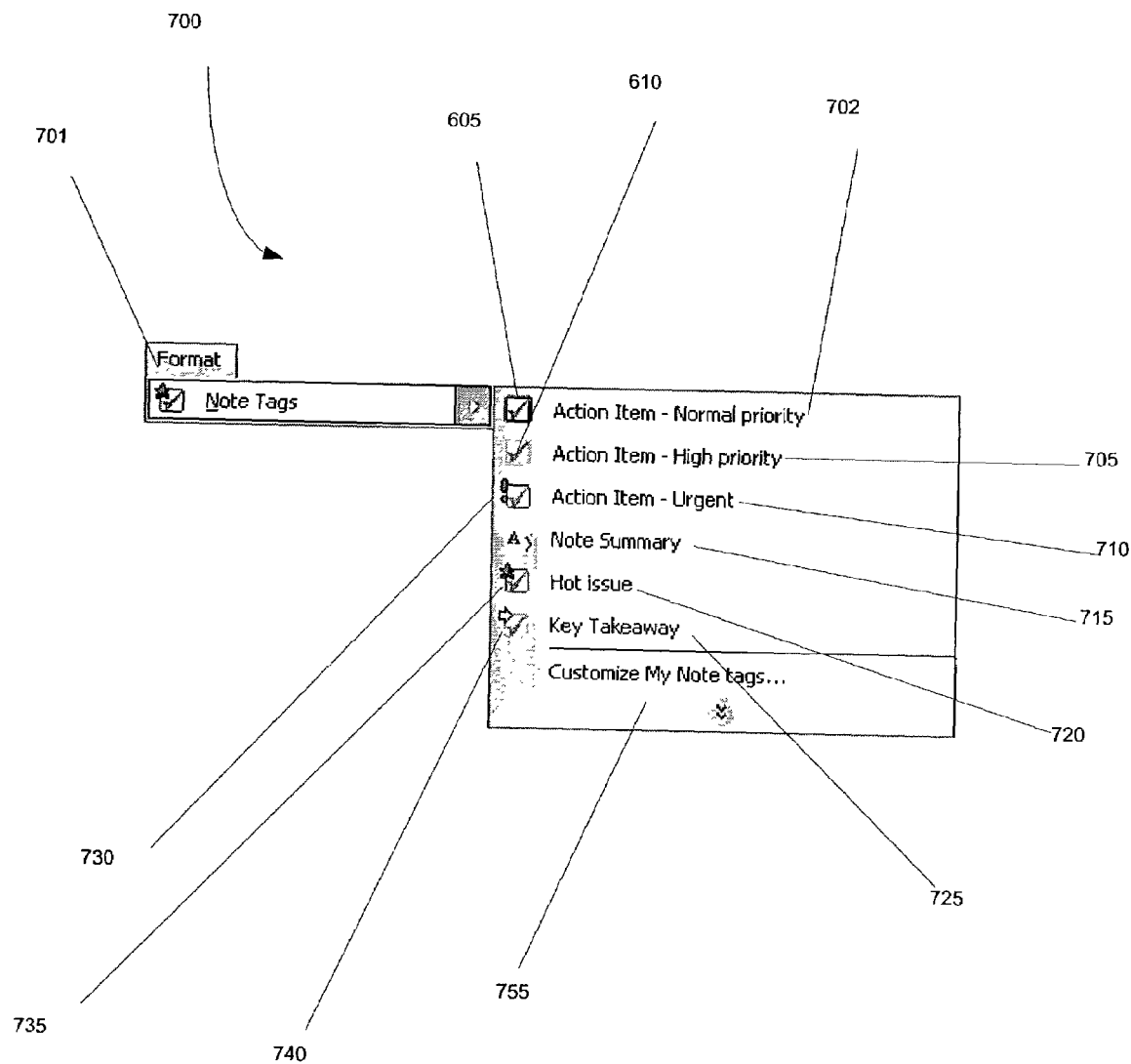
FIG. 7 is a representative display illustrating the configurability of data object note tags and completion/recognition checkboxes of an exemplary embodiment of the present invention.

As stated above, the data object note tags associated with the designation tools may be configurable by the user. FIG. 7 is illustrative of exemplary embodiments 700 of the different physical features of note tags and associated checkboxes. A user may reveal these different note tags by clicking on an icon 701 present on a tool bar. Examples of data categories as labeled in data object note tags include "action item—normal priority" 702, "action item—high priority" 705, "action item—urgent" 710, "note summary" 715, "hot issue" 720, "key takeaway" 725, "personal to-do," "personal reminder," and "important information" (not shown). The data object note tags may also comprise a shaped feature indicating the content of the data category. Examples of shaped features include without limitation an exclamation mark 730, a star 735, and an arrow 740. The data object note tag may also comprise a checkbox 605 which may be engaged by a user upon completion and/or recognition of a task or other data content associated with the data object note tag. The user may engage the task completion/recognition checkbox by clicking inside the checkbox with the stylus thereby displaying a check 610 inside the box. The data object note tags associated with the varying data categories may be fully configurable by the user as reflected in 755.

Figure 8A:
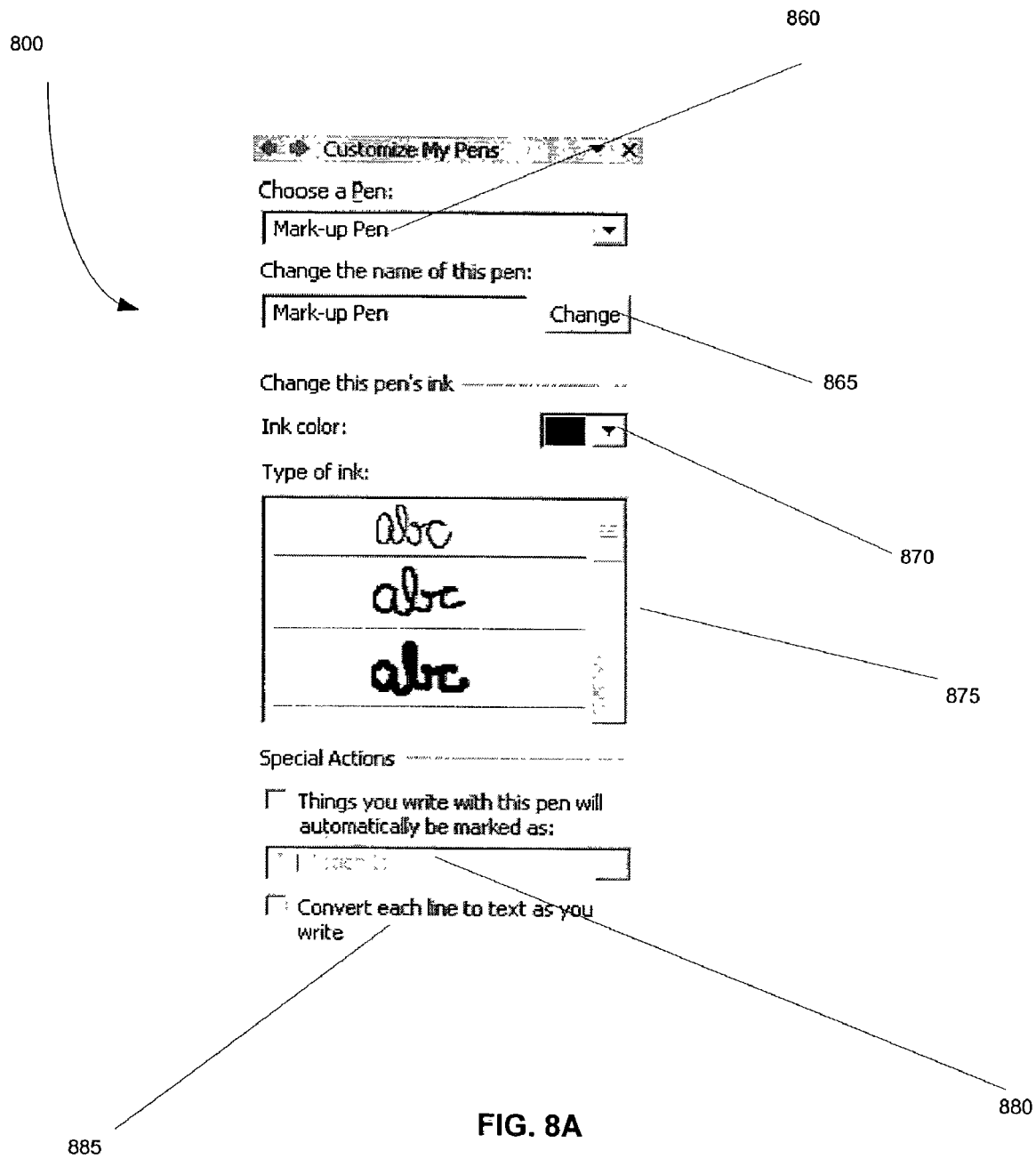
FIG. 8A is a representative display illustrating the configurability of designation tools of an exemplary embodiment of the present invention.

FIG. 8A represents an exemplary embodiment 800 of the present invention wherein the user elects to customize designation tools (also referred to as "pens"). In this example, the "pen" chosen is "Mark-up Pen" 860. The user has the option 865 to change the name of the "pen". Additionally, the user has the option to change the color of the ink 870 and the width of the ink 875 associated with the "pen". Further, the user has the option to associate the "pen" with a data object note tag displaying the name of a data category as reflected by a data object note tag "Action Item" 880. As reflected at 885 the user also has the option to engage the selected pen to convert the user's script to text at the end of each line. Those skilled in the art will appreciate that the options associated with a given "pen" may vary in accordance with the user's particular needs. Further, those of skill in the art will appreciate that the layout of the graphical user interface displays illustrated herein may be modified so long as the user is able to "click" through and select appropriate options with relative ease.

In one exemplary embodiment of the present invention a user has the option to post-designate existing written data content with designation tools. In this embodiment the user may select with a stylus, for example, a highlighter designation tool that corresponds to the data category that the user elects to categorize existing script with. In this embodiment, once the user has highlighted existing data content with a designation tool highlighter associated with a data category that the user elects to categorize the data content with, the respective data object note tag related to that data category is displayed in connection with the highlighted information. Similar to writing data content with a designation tool pen, the post-designated data object note tag may also be associated with a completion/recognition checkbox. Designation tool pens may also be used, for example, to underline or circle existing data content to post-designate that data content into a data category.

Figure 8B:
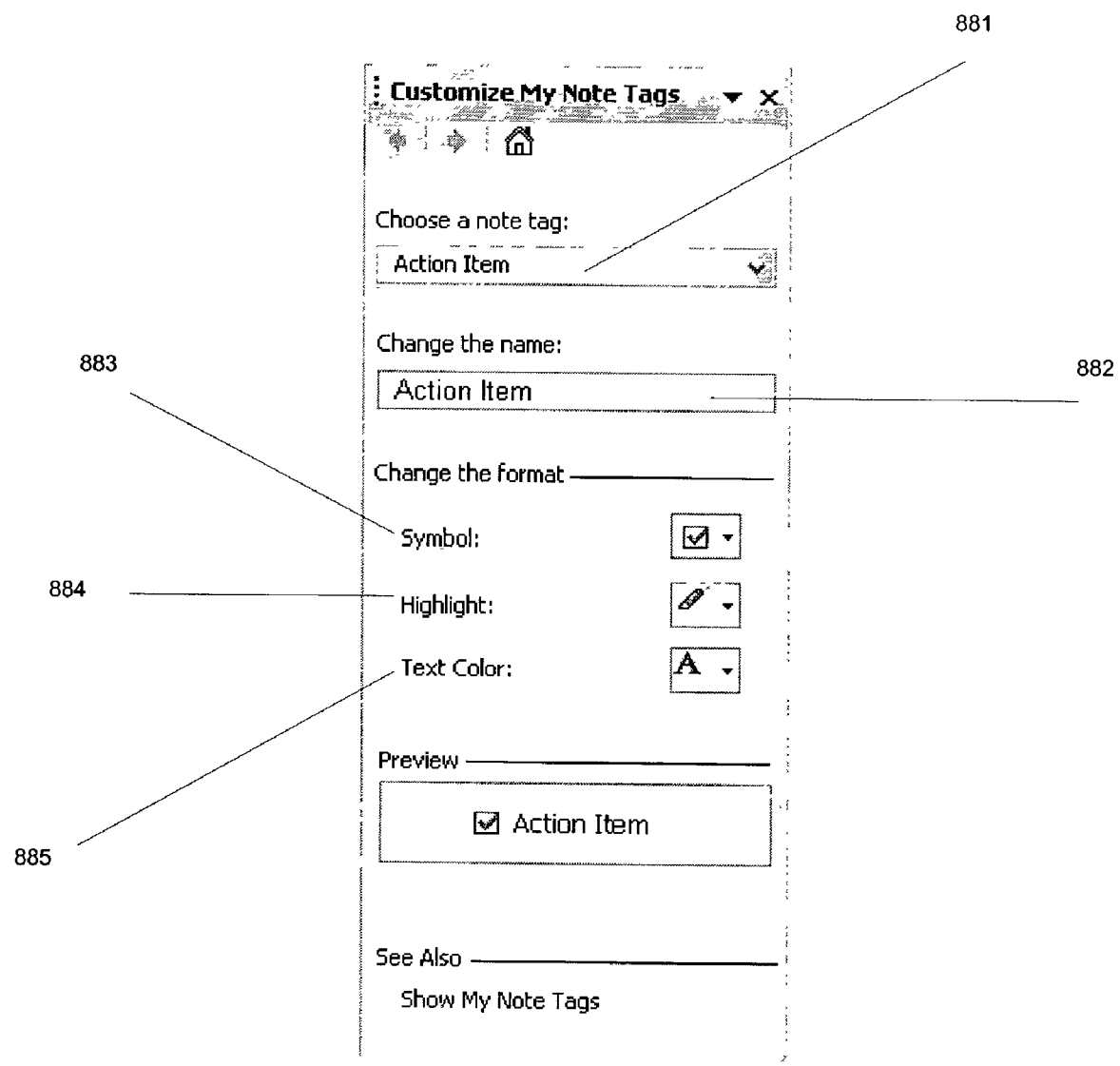
FIG. 8B is a representative display illustrating the configurability of designation tools of an exemplary embodiment of the present invention.

FIG. 8B is illustrative of an exemplary embodiment of the present invention wherein the user customizes the data object note tags associated with specific data categories. In this example, the user may choose a specific data object note tag 881. The user also has the option to change the name of the data category 882. Additionally, the user may change the symbol 883 associated with the data object note tag. Further the user has the option to configure specific designation tools as highlighters 884, or associate designation tools with specific colors 885.

Figure 8E:
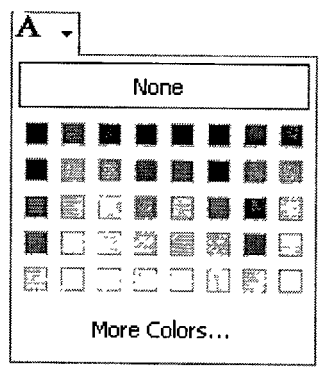
FIG. 8E is a representative display illustrating the color configurability of designation tools and related electronic ink, data object note tags and checkboxes of an exemplary embodiment of the present invention.
Figure 8C:
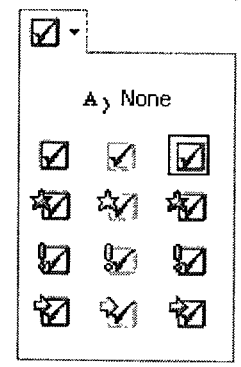
FIG. 8C is a representative display illustrating the configurability of designation tools and related data object note tags and checkboxes of an exemplary embodiment of the present invention.
Figure 8D:
FIG. 8D is a representative display illustrating the configurability of designation tools and related data object note tags and checkboxes of an exemplary embodiment of the present invention.

FIGS. 8C, 8D, and 8E further illustrate the customizable options associated with the designation tools and related data object note tags and task completion/recognition checkboxes. Specifically, FIGS. 8C and 8D are illustrative of an exemplary screen displays 882 and 883 wherein the user may choose the shape and content of task completion/recognition checkboxes to be associated with specific data categories and designation tools. Examples of the physical features of exemplary checkboxes include a blue checkbox 883(*a*), blue 5-point star 883(*b*), blue exclamation 883(*c*), blue arrow 883(*d*), yellow checkbox 883(*e*), yellow 5-point star 883(*f*), yellow exclamation 883(*g*), yellow arrow 883 (*h*), green checkbox 883(*i*), green 5-point star 8830), green exclamation 883(*k*), and green arrow 883(*l*). FIG. 8E illustrates an exemplary screen display 884 wherein the user may configure the ink color to be associated with a given designation tool. Those of skill in the art will recognize that the ink of the designation tools may be of any width and color so long as the user associates the ink with a given data category. Additionally, the task completion/recognition checkboxes may be configured in any manner by the user so long as the user appreciates the data category associated with the task completion/recognition checkbox and can differentiate between an engaged and non-engaged checkbox.

Figure 9A:
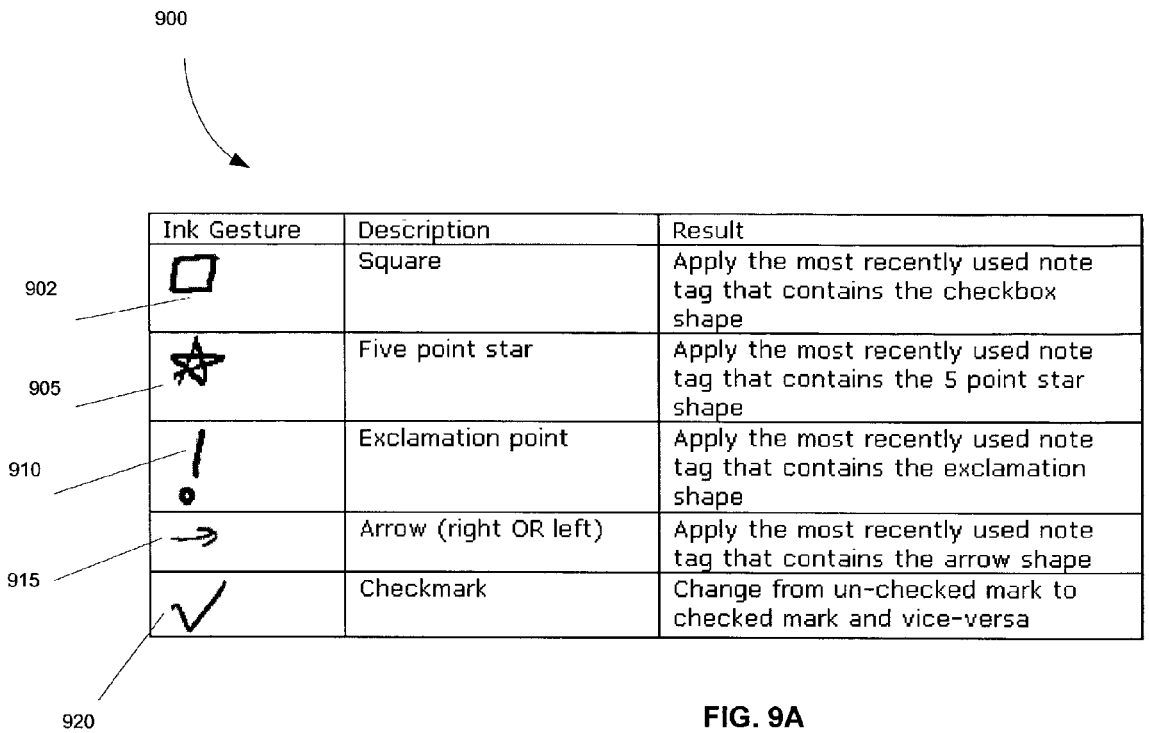
FIG. 9A is a representative display illustrating the configurability of selecting designation tools through written gestures of an exemplary embodiment of the present invention.
Figure 9B:
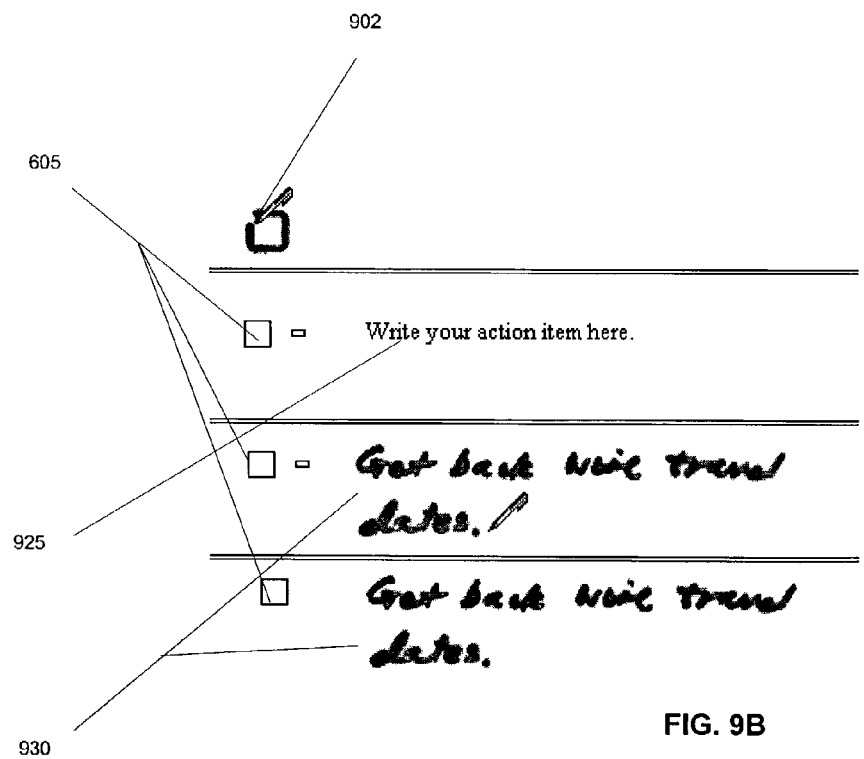
FIG. 9B is a representative display illustrating the configurability of selecting designation tools through written gestures of an exemplary embodiment of the present invention.

FIG. 9A illustrates a representative embodiment 900 of the present invention wherein the user is enabled to select a designation tool by writing a specific shape in electronic ink on a tablet screen. In this embodiment, writing the shape (or gesture) initiates the engagement of a designation tool associated with that shape. In this example, if a user draws a square 902 at the beginning of a tablet line in electronic ink, a designation tool is selected and a corresponding data object note tag appears at the beginning of the line. As the user writes the data content following the square ink gesture, that data content is categorized into the data category associated with the selected designation tool. Additional examples of ink gestures which may trigger the selection of a designation tool include the five point star 905, exclamation point 910, arrow (right or left) 915, and checkmark 920. FIG. 9B further illustrates a user's ability to engage designation tools by making specific ink gestures in connection with lines, headings, paragraphs, or pages that are to receive a user's handwritten electronic ink. In this example, the square ink gesture 902 operates to select a designation tool that is associated with an "action item" data category 925. Further illustrated is an exemplary action item 930 written by a user as prompted by the selection of a designation tool. A check box 605 is further illustrated at the front of the written content.

The ink gesture selection of designation tools may also be used to categorize existing electronic ink into data categories. In this embodiment, a user may make the ink gesture at the beginning of a line of existing electronic ink so as to designate that existing information into the data category associated with the designation tool selected by the ink gesture.

Figure 10:
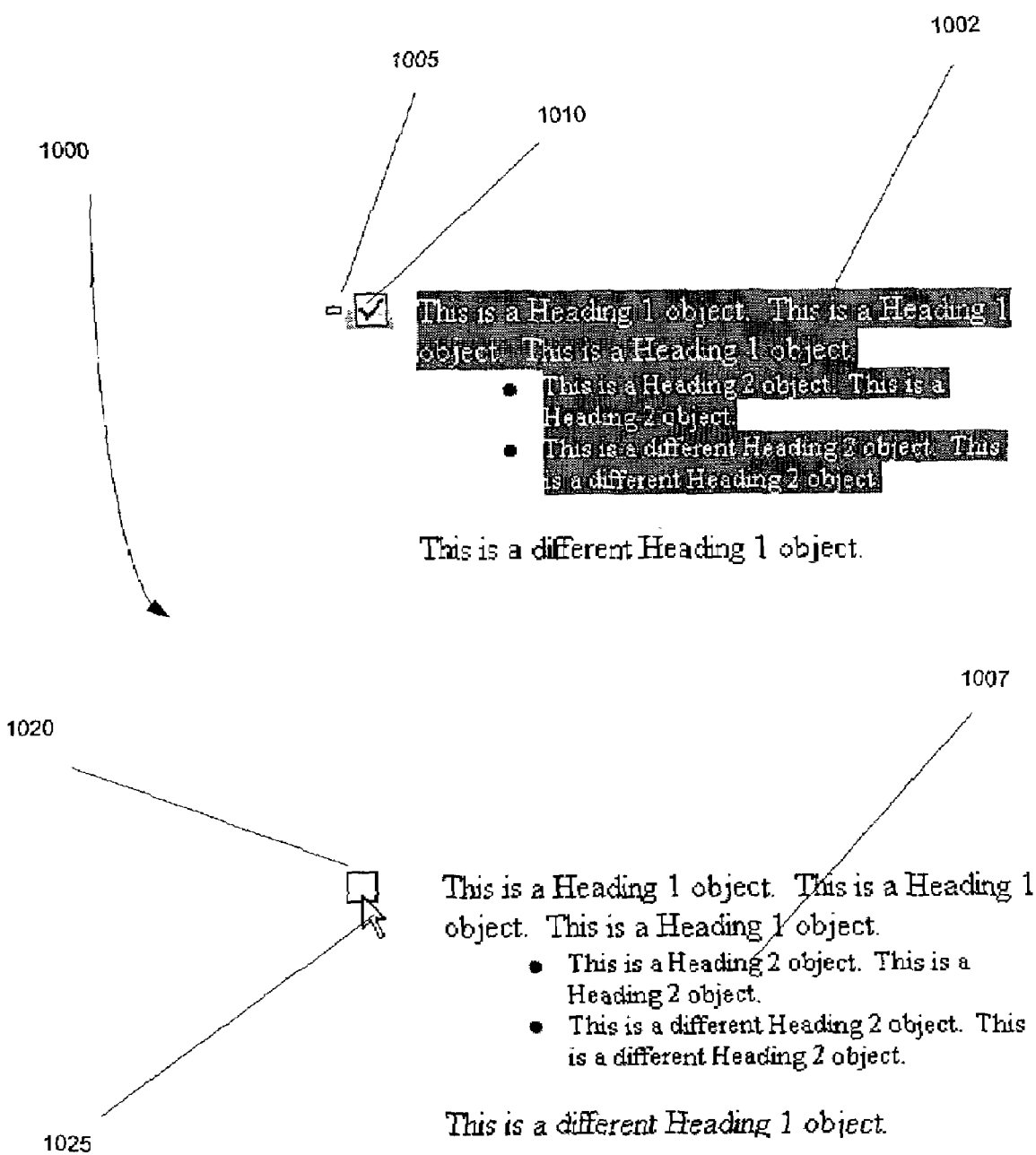
FIG. 10 is a representative display illustrating handwritten information as converted to text and the location of data object note tags in relation to information.

FIG. 10 illustrates an exemplary embodiment of the present invention 1000 wherein a user's script has been converted to text. In this embodiment, a data object note tag comprising a checkbox 1005 is associated with the highlighted text 1002 or non-highlighted text 1007. The task completion/recognition checkbox 1005 may be engaged reflecting a checkmark 1010 or remain unchecked 1020 until engaged by the user. The data completion/recognition checkbox may be engaged by the user to reflect a checkmark by placing the cursor 1025 on the box 1020 and clicking on it.

Figure 11:
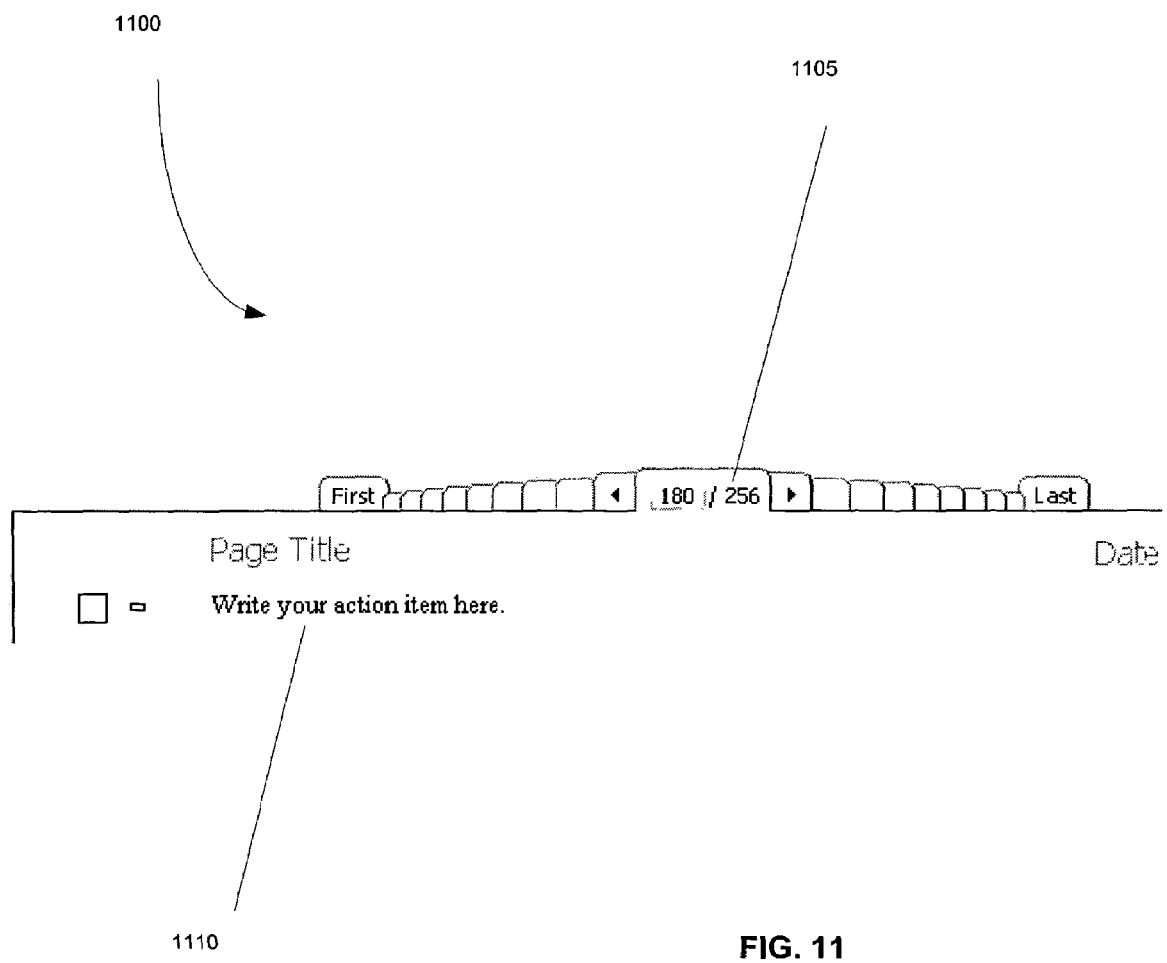
FIG. 11 is a representative display illustrating designation tools as used in organizing and managing large documents of an exemplary embodiment of the present invention.

FIG. 11 illustrates an exemplary embodiment of the present invention wherein the user has created a document 1100 of 256 pages 1105. In this example, the user is prompted 1110 to write an action item beginning on page 180. Also shown is checkbox 605. In one embodiment of the present invention, the user has the option to sort like categorized information together. This feature may be of particular interest to users who have created large documents such as that illustrated at 1100. In another embodiment, the user may also sort categorized information by engagement of task/recognition checkboxes.

Although the present invention has been described in connection with various exemplary embodiments, there is of ordinary skill in the art will understand that many modifications can be made thereto within the scope of the claims that follow. Accordingly, it is not intended that the scope of the invention in any way be limited by the above-description, but instead be determined entirely by reference to the claims that follow.

What is claimed is:

1. A designation tool for categorizing data content displayed in electronic ink on a computer screen, the designation tool comprising:
    a data category, wherein the data category is selected among a plurality of data categories in response to a user selection of the designation tool based on a selection of a writing tool;
    a data object note tag associated with the selected designation tool for displaying a data category label in association with categorized electronic ink, wherein a presentation of the data object note tag is customizable, and wherein the presentation of the note tag includes an ink highlight option, an ink width option, a special action option, and a format option for a checkbox engageable by the user upon the completion of a written task the format option for the checkbox comprising at least one from a set of: a color of the checkbox and a symbol to be associated with the checkbox; and
    a selection component for engaging the designation tool to categorize data written in electronic ink.

2. The designation tool of claim 1, wherein the symbol to be associated with the checkbox includes at least one from a set of: a star, an exclamation point, and an arrow.

3. The designation tool of claim 1, wherein the checkbox, when engaged, displays one of: an X and a $\sqrt{}$ in the checkbox.

4. The designation tool of claim 1, wherein the designation tool is operable to categorize data content inputted while the designation tool is engaged.

5. The designation tool of claim 1, wherein the designation tool is operable to categorize data content selected while the designation tool is engaged.

6. The designation tool of claim 1, wherein the selection component comprises an icon on a graphical user interface corresponding to a data category associated with the designation tool.

7. The designation tool of claim 1, wherein the data category label is at least one of the following: action item, priority item, note summary, personal to do, personal reminder, important information, hot issue, and key takeaway.

8. The designation tool of claim 1, wherein the data category object note tag is displayed at the beginning of a line of an electronic document.

9. The designation tool of claim 1, wherein the data category object note tag is displayed at the beginning of a paragraph of an electronic document.

10. The designation tool of claim 1, wherein the data category object note tag is displayed at the beginning of a page of an electronic document.

11. A method for categorizing data content comprising:
receiving a selection of a designation tool that is associated with a data category;
receiving inputted data content in electronic ink;
categorizing the data content in the data category associated with the designation tool based on a selection of a writing tool; and
rendering identifiable the data category by displaying a data object note tag in association with the data content, the data object note tag identifying the data category, wherein the data object note tag is associated with the selected designation tool, and wherein a presentation of the data object note tag is customizable by a user, the presentation of the note tag including an ink highlight option, an ink width option, a special action option, and a format option for a checkbox engageable by a user upon the completion of a written task the format option for the checkbox comprising at least one from a set of: a color of the checkbox and a symbol to be associated with the checkbox.

12. The method of claim 11, further comprising:
sorting categorized data content with similarly categorized data content in an electronic document.

13. A method for categorizing data content comprising:
selecting a designation tool that is associated with a data category based on a selection of a writing tool;
selecting data content to be categorized into the data category;
categorizing the data content in the data category associated with the selected designation tool; and
rendering identifiable the data category by displaying a data object note tag in association with the data content, the data object note tag identifying the data category, wherein the data object note tag is associated with the selected designation tool, and wherein a presentation of the data object note tag is customizable by a user, the presentation of the note tag including an ink highlight option, an ink width option, a special action option, and a format option for a checkbox engageable by a user upon the completion of a written task the format option for the checkbox comprising at least one from a set of: a color of the checkbox and a symbol to be associated with the checkbox.

14. The method of claim 13, wherein the data content comprises at least one of the following in an electronic document: a line, a heading, a paragraph and a page.

15. A method for categorizing data content comprising:
receiving an identification of a data category for categorizing data content;
associating the data category with a data object note tag for rendering identifiable the data category in association with categorized data content;
enabling a user to customize a presentation of the data object note tag, wherein the presentation of the data object note tag is customizable, and wherein the presentation of the note tag includes an ink highlight option, an ink width option, a special action option, and a format option for checkbox engageable by the user upon the completion of a written task the format option for the checkbox comprising at least one from a set of: a color of the checkbox and a symbol to be associated with the checkbox;
associating the data category and the data object note tag with a designation tool for categorizing inputted data content into the data category, wherein the designation tool is associated with a writing tool;
automatically selecting the designation tool that is associated with the data category;
receiving inputted data content in electronic ink;
categorizing the data content into the data category associated with the designation tool; and
rendering identifiable the data category by displaying the data object note tag in association with the data content, the data object note tag identifying the data category.

16. The method of claim 15, further comprising:
configuring a physical feature of the data object note tag.

17. The method of claim 15, wherein the physical feature comprises at least one of the following: color and shape.

18. A method for categorizing data content comprising:
receiving a selection of a designation tool associated with a user selected writing tool that is associated with a data category;
receiving inputted data content in electronic ink;
categorizing the data content in the data category associated with the designation tool;
rendering identifiable the data category by displaying a data object note tag identifying the data category in association with the data content, wherein the data object note tag is associated with the selected designation tool and a includes a graphical user interface engageable by a user upon the completion of a written task; and
enabling the user to customize the graphical user interface of the data object note tag, wherein the graphical user interface of the note tag includes an ink highlight option, an ink width option, a special action option, and a format option for checkbox engageable by the user upon the completion of a written task the format option for the checkbox comprising at least one from a set of: a color of the checkbox and a symbol to be associated with the checkbox.

19. The method of claim 18, wherein the designation tool is operable to categorize at least one of: inputted and selected data content while the designation tool is engaged.

20. The method of claim 18, wherein the graphical user interface further includes an icon corresponding to the data category associated with the designation tool.

21. The method of claim 18, further comprising:
configuring a physical feature of the data object note tag.

* * * * *